US005685929A

United States Patent [19]

Bettinelli et al.

[11] Patent Number: 5,685,929

[45] Date of Patent: Nov. 11, 1997

[54] SMOOTH PRESS IN A MACHINE FOR MANUFACTURING CORRUGATED CARDBOARD

[75] Inventors: Fabio Bettinelli; Jens Schulz, both of Hamburg, Germany

[73] Assignees: Peters Maschinenfabrik GmbH, Hamburg, Germany; Bobst SA, Lausanne, Switzerland

[21] Appl. No.: 634,461

[22] Filed: Apr. 18, 1996

[30] Foreign Application Priority Data

Apr. 24, 1995 [CH] Switzerland .......................... 01159/95

[51] Int. Cl.[6] ........................................ B32B 31/00

[52] U.S. Cl. ........................ 156/64; 156/205; 156/358; 156/361; 156/471; 156/472; 100/47; 226/25

[58] Field of Search ....................... 156/64, 205, 212, 156/358, 361, 470, 471, 472, 473, 555, 582; 100/47, 168; 226/25

[56] References Cited

U.S. PATENT DOCUMENTS

| | | | |
|---|---|---|---|
| 3,707,909 | 1/1973 | Volkers | 100/47 |
| 4,038,122 | 7/1977 | Deligt | 156/64 |
| 4,481,066 | 11/1984 | Hirakawa et al. | 156/472 |
| 4,704,171 | 11/1987 | Thompson et al. | 156/64 |
| 4,773,963 | 9/1988 | Seki et al. | 156/470 |
| 4,818,330 | 4/1989 | Mosburger | 156/473 |
| 5,223,071 | 6/1993 | Gersbeck | 156/358 |
| 5,344,520 | 9/1994 | Seki et al. | 156/358 X |

FOREIGN PATENT DOCUMENTS

| | | | |
|---|---|---|---|
| 0 260 526 | 3/1988 | European Pat. Off. . | |
| 536518 A1 | 4/1993 | European Pat. Off. | 156/358 |
| 2142591 | 2/1973 | France . | |
| 2 708 011 | 1/1995 | France . | |
| 25 27 819 | 12/1976 | Germany . | |
| 43 05 158 | 8/1994 | Germany . | |
| 5-96668 A | 4/1993 | Japan | 156/358 |
| 2 188 074 | 9/1987 | United Kingdom . | |
| 2 281 921 | 3/1995 | United Kingdom . | |

*Primary Examiner*—David A. Simmons
*Assistant Examiner*—Paul M. Rivard
*Attorney, Agent, or Firm*—Hill, Steadman & Simpson

[57] ABSTRACT

A smooth press comprises a smooth cylinder acting conjointly with a lower ribbed cylinder in order to apply a covering paper against a corrugating paper passing around the ribbed cylinder and includes a tractor arrangement downstream from the lower ribbed cylinder situated with respect to the smooth cylinder so as to form a contact angle of the covering paper against the ribbed cylinder. The tractor arrangement applies a tension force to the cardboard which creates a reactive radial pressure urging the cover paper against the corrugated paper at the contact surface of the ribbed cylinder. A linear support load of the smooth cylinder against the lower ribbed cylinder is regulated at a low value in a range of 0 to 7N/mm by a mounting arrangement for the lower cylinder, which includes a pair of levers subjacent to the ribbed cylinder, the two ends on the same side of the pair of levers being rotationally mounted on an axle fixed to the frame and the two other ends being held by an actuator at a constant pressure across a first detector, with the upper edge of each lever resting against an adjustable stop having a motorized cam across a second force detector.

5 Claims, 1 Drawing Sheet

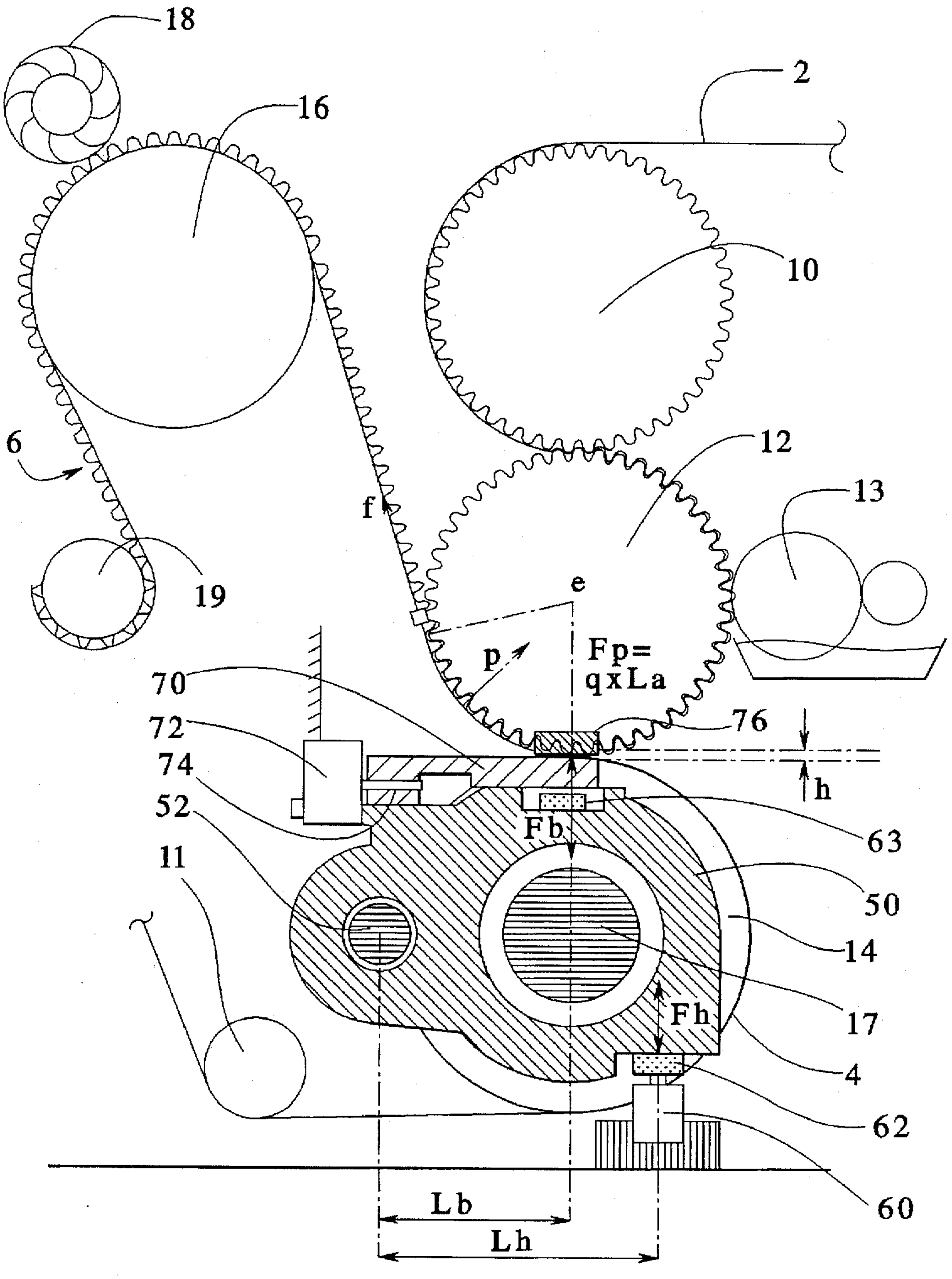
18
16
2
10
6
12
13
f
19
e
p
Fp=
qxLa
70
72
74
52
11
76
h
63
Fb
50
14
17
Fh
4
62
60
Lb
Lh

SMOOTH PRESS IN A MACHINE FOR MANUFACTURING CORRUGATED CARDBOARD

BACKGROUND OF THE INVENTION

The present invention is ditched to a smooth press in a machine for manufacturing corrugated cardboard, which is a so-called single-sided machine and makes a sheet of corrugated paper of which the ridges are glued to a first covering sheet. This intermediate piece of cardboard is also called single-sided. In the subsequent machine, called double-sided, this first piece of cardboard is either assembled directly to a second exterior sheet of covering paper in order to produce a piece of cardboard called a double-sided cardboard or is assembled to a second single-sided piece of cardboard in order to obtain a final piece of cardboard called a double-double.

In a single-sided machine, the corrugated paper is pre-heated and humidified before passing between two ribbed cylinders heated with steam. The ribbed cylinders have meshing ribs which corrugate the sheet of paper. The corrugation thus produced is held against the lower ribbed cylinder by means of combs or by a system of excess pressure from an exterior environment or by a partial vacuum system from the interior of the lower ribbed cylinder, whose surface presents communication slits with grooves. A glue-spreading roller, which is steeped in a tub of glue, deposits a predetermined quantity of glue on the ridges or crests of the corrugations. The covering paper, also pre-heated, and the corrugated paper are then finally assembled by pressure between the lower ribbed cylinder and a supporting arrangement called a smooth press.

The most commonly used smooth press is made of a smooth cylinder or roller extending parallel to the lower ribbed cylinder and supported to be biased thereagainst. These two cylinders rotate at the same circumferential speed in such a way that the covering paper and the corrugated paper are moving in an identical manner at the time of their assembly. Moreover, the smooth cylinder is supported against the ribbed cylinder with a very high force, so that the pressure at the line of contact is sufficient to burst the glue cells and to simultaneously apply the covering paper firmly against the corrugated paper. Finally, this smooth cylinder is heated in order to correspondingly accelerate the setting of the glue. However, the major disadvantage of this smooth cylinder is the brutal and repetitive bumps produced at each passage of a rib of the lower cylinder, due to the force of support, which is necessarily large. Not only do these bumps damage the ridges of the corrugation of the cardboard, but they also generate a loud ambient noise. In addition, at some speeds, a resonance phenomena may occur, in the course of which the cylinders may oscillate transversely along their axle of rotation, with the result that the sheet of paper is no longer correctly applied and glued. These bumps also cause a premature wearing of the ribs of the lower cylinder.

In order to overcome these problems, smooth presses have been proposed, whose contact surface is larger than that which extends between two ribs. According to a first solution mentioned in U.S. Pat. No. 4,481,066, whose disclosure is incorporated herein by reference thereto, and described in more detail in French 2 142 591, the smooth press is made up of a crossbeam held at the ends by lower arms, and whose active surface facing the lower ribbed cylinder is cylindrically arced with a radius equal to, or even slightly greater than, that of the ribbed cylinder. By acting on the upper arms of the levers at the end by means of a pair of jacks, it is possible to bring this arcuate surface into contact with the ribbed cylinder with a predetermined pressure. The edges of the active surface can be folded toward the outside or can be provided with return rollers in order to better conduct the covering sheet. This crossbeam may also be hollow for the passage of heated steam. However, a crossbeam of this sort, being less balanced and less rigid than a cylinder, can twist and/or warp, with the result that the pressure of application is no longer uniform along the entire length of the ribbed cylinder. The quality of the gluing is then seriously affected.

U.S. Pat. No. 4,481,066 also mentions that the support of the arced or curved crossbeam induces a large frictional force on the covering paper. The unwinding of the covering paper is, thus, slowed down in relation to that of the corrugated paper to such an extent that it is necessary to install, at an exit of the machine, a traction arrangement for the cardboard, essentially acting on the covering paper in order to compensate for this reduced speed. However, this arrangement is provided only in order to equalize the speed. In addition, since the arrangement requires a plurality of perforated endless belts arranged side-by-side, which pass over a depressurized box or vacuum plenum to create a gripping on the sheet moving along the belt, the arrangement is heavy and complicated.

According to a second solution mentioned in French Patent 2 142 591 and better described in German DE 25 27 819, the smooth press is made of an endless belt passing between upper and lower rollers situated parallel to and close to the lower ribbed cylinder, respectively, at half-height and underneath. This belt is thus in contact with the ribbed cylinder over a quarter of the lower circumference. This endless belt can be a thin steel belt or a mat of threads of copper, cotton or synthetic fibers. However, the pressure applied to the sheets by this smooth press depends on the tension applied to the endless belt. It is, thus, advisable to provide a complex arrangement for the mechanical separation of one of the endless belt rollers in relation to the other, with the capability of adjusting this high tension to a precise value. Again, it is impossible to guarantee the maintenance of a constant tension along the entire width of the endless belt and, thus, a uniform application pressure of the covering sheet against the corrugated sheet.

German OS 43 05 158 discloses an arrangement for regulating the force of a support of an upper smooth cylinder against a ribbed cylinder mounted therebeneath. In this arrangement, the two ends of the smooth cylinder are mounted on a pair of levers, with the upstream ends of the levers being rotationally mounted on an axle fixedly attached to the frame, while the two downstream ends each rest on a vertically mobile stop controlled by a corresponding motorized cam. On each side, a constant-pressure hydraulic actuator exerts a vertical force oriented downward on the downstream end of the corresponding lever. On both sides, a force detector inserted between the stop and the downstream end of the lever measures the downward resultant force of the weight of the cylinder and of the support of the actuator more or less compensated upwardly by the counter-reaction of the ribbed cylinder. If the resultant force differs from a reference setting, the position of the cam is modified, which raises or lowers the stop and the end of the lever and, thus, modifies the counter-reaction of the smooth cylinder. However, this arrangement is essentially conceived for the regulation, based on a single global measure, of a very large support load capable of bursting the glue cells and assembling the papers at a single line of contact. The force detectors are thus chosen so that the high values can be read with the given precision. In a case of regulation of a light load, the force detectors would read, practically constantly, the maximum force resulting from the weight of a combination of the cylinder and the support of the actuators and would be absolutely insensitive to any variation in the light load. In addition, the apparent change in the weight of the cylinder due to changes in the tension of the covering paper or a drift in the pressure of the actuators can completely fool the counter-reaction sensors.

SUMMARY OF THE INVENTION

The object of the present invention is to provide a smooth press in a single-sided machine for manufacturing corrugated cardboard that will be more effective, notably by applying, in a constant manner, a uniform pressure along the entire width of a covering sheet assembled to a corrugating sheet passing around the lower ribbed cylinder of a corrugating arrangement. The smooth press must permit the adjustment of the application pressure to a value just necessary and sufficient to obtain an effective setting of the glue without damaging the sheet. In addition, the design of the smooth press has to be relatively simple in order to insure a reliable functioning over time, as well as an ease of implementation and maintenance at reasonable cost.

To accomplish these goals, the present invention is directed to an improvement in a smooth press comprising a smooth cylinder, means mounting the cylinder to act in conjunction with a lower ribbed cylinder in order to apply a covering paper against the corrugated paper passing around this lower ribbed cylinder, said press additionally including a tractor means arranged downstream from said lower ribbed cylinder and situated with respect to the smooth cylinder so as to create a contact angle of the covering paper against the ribbed cylinder over a portion of the circumferential periphery of the ribbed cylinder, said tractor means applying a tension to the cardboard, which creates a resulting pressing force to urge the covering paper against the corrugated sheet along the contact surface. The improvements are that means to regulate the linear support load of the smooth cylinder against the lower ribbed cylinder at a low value in a range between 0 and 7N/mm and that the means for mounting the smooth cylinder includes the ends of the cylinders being received in a pair of levers subjacent to the ribbed cylinder, the two ends of the same side of said pair of levers being rotationally mounted on an axle fixedly attached to the frame of the smooth press, the other ends opposite the rotationally mounted ends being held by an actuator at a constant pressure across a first force detector, an upper edge of each lever being rested on an adjustable stop across a second force detector.

The contact angle or tension angle is meant as the angle at the vertex of the circular arc in a vertical plane transverse to the ribbed cylinder, defining a contact surface, which forms a portion of the cylinder, between the covering paper and the ribbed cylinder, which contact surface is also called a tension surface. The tension of the traction is defined as the force of traction per unit of width of the paper. Analogously, the linear support load is defined as the support force per unit of width exerted by the smooth cylinder on the line of contact with the ribbed cylinder.

According to a preferred embodiment, the tractor arrangement is provided with a complementary parallel flexible support roller acting on the flutes of the corrugated paper.

Advantageously, the contact between each lever and its stop is situated at a level of the line of contact between the smooth cylinder and the ribbed cylinder.

According to another embodiment, the axle of rotation of the lever is situated at the same height as the axle of the smooth cylinder, and the covering paper is guided by an upstream roller so that it enters into contact with the smooth cylinder at a level of a lower generating line and leaves it at the level of the upper generating line. The tractor cylinder is provided with a complementary parallel flexible support roller acting on the corrugated paper in order to limit the sliding of the cardboard to only a strictly necessary amount.

The method of regulation of the linear support force utilized in this smooth press consists of steps of lifting, by means of the actuators, the levers and smooth cylinder in order to read the value of the first detectors affected only by the weight of the elements and then recalibrating the readings to a zero point, then bringing the levers to rest by means of an actuator against the adjustable stops with a force Fh read from the first associated detector, relieving the force of the counter-reaction Fb of the corresponding stop as read by the second detector, and establishing, at the axle of rotation of the lever, with the equality of the torques $Fh \times Lh = Fb1 \times Lb$, wherein Lh and Lb are the distance from the center of the axle of the lever to the actuator and of the cam, respectively, then modifying the position of each cam in order to adjust the position of the stop to support the smooth cylinder against the ribbed cylinder, creating on both sides a force of counter-reaction Fp of the ribbed cylinder by diminishing the size of the cam while obtaining the new equality of the torques $Fh \times Lh = (Fb2 \times Lb) + (Fp \times Lp)$, wherein Lp is the distance between the center of the axle and the line of contact of the smooth cylinder with the ribbed cylinder and Fb2 is the new reading of the second detector, then controlling the position of each cam for the reading of the second detector Fbi in such a way as to maintain, on both sides, the force Fp at a constant value such that $2 \times Fp$/width of the paper=the desired linear load q.

In other words, one begins by clamping each lever between a support actuator and the adjustable stop with a first holding force Fh, avoiding any fluctuation or vibration, independent of the weight. Then, one transfers, in a controlled manner, a part of this clamping force to a supporting force of the smooth cylinder against the ribbed cylinder. Thus, the determination of the counter-reaction of the ribbed cylinder is effected by a differential measure that gives an excellent resolution in comparison with an absolute measuring including values supposed, incorrectly, to be constant. For example, the two force detectors may be resistance gauges whose variations in resistance are detected by an electrical assembly called a Wheatstone bridge.

Advantageously, the contact between each lever and its stop is situated at the level of the line of contact between the smooth cylinder and the ribbed cylinder. Thus, the second detector is directly affected by this counter-reaction of the ribbed cylinder so as to avoid random perturbations. In this way, the equality of the center distance of the axes is obtained so that Lb=Lp.

Preferably, the rotational axle of the lever is situated at the same height as the axle of the smooth cylinder, and the covering paper is guided by an upstream roller so as to enter into contact with the smooth cylinder at a level of its lower generating line and to leave it at the level of its upper generating line, for example the two generating lines belonging to the same median vertical plane of the cylinder. Thus, the harmful effects of the variations and tension in the covering paper on the apparent weight of the smooth cylinder are eliminated.

The invention is explained in more detail by means of an exemplary embodiment, and further objects and advantages of the present invention will be readily apparent from the following description of the preferred embodiment, the drawing and claims.

BRIEF DESCRIPTION OF THE DRAWING

The FIGURE is a schematic side view of a single-sided machine for manufacturing a piece of cardboard including the smooth press of the present invention.

DESCRIPTION OF THE PREFERRED EMBODIMENTS

The principles of the present invention are particularly useful when incorporated in a smooth device or press utilized in a machine for forming single-sided corrugated paper, as illustrated in the FIGURE. The machine includes an upper ribbed cylinder or roll 10, which meshes with a lower ribbed cylinder or roll 12. A sheet of paper 2 enters the machine on the top and makes a half-turn around the upper ribbed roller 10. This paper is corrugated at the point at which the upper ribbed cylinder 10 meshes with a lower ribbed cylinder 12 and the corrugated paper thus shaped is held against the lower ribbed cylinder during a second half-turn downward by an arrangement (not shown), which may consist of combs, of an exterior excess pressure created in a casing box or a partial vacuum which is internally applied to the lower ribbed cylinder 12, which has radial openings that permit a suctioning of the paper at the base of each of the grooves between ribs. During this second half-turn, a glue-spreading roller 13 deposits a line of glue on each ridge or flute of the corrugation.

To form the piece of cardboard 6, which is a single-sided cardboard made up of an assemblage of the corrugated paper 2 plus a covering layer 4, a web of covering paper 4 is guided by an upstream roller 11 so as to arrive horizontally toward a lower smooth cylinder 14, which enters into contact tangentially at the level of its lowest point of travel or generating line. This paper is pre-heated during a half-turn rotation around the smooth cylinder, which it leaves at the level of the upper generating line when it is applied in complete parallel fashion against the corrugated paper 2 on the lower ribbed cylinder or roller 12.

More particularly, according the invention, the piece of cardboard 6 thus shaped and leaving the ribbed cylinder 12 is drawn downstream by a calendar made up of a traction cylinder 16 coacting with a flexible support roller 18. The piece of cardboard 6 thus moves by means of its more solid covering paper around the upper half of the traction cylinder 16. The contact pressure between this piece of cardboard and this traction cylinder is reinforced by the support of the roller 18 acting against the more fragile flutes of the corrugated paper. For this purpose, the support roller comprises a circumference made of an elastomer connected to a central shaft by a series of radial longitudinally extending blades, also made of elastomer, whose transverse section is oblique or even curved inward. After passing the roller 18, the corrugated board 6 is passed around an idler 19, which is arranged so that the corrugated board passes around approximately 180° of the surface of the roll or cylinder 16.

The traction cylinder 16 turns at a circumferential speed which is greater by 4% to 6%, and preferably around 5%, than the speed of the unwinding of the piece of cardboard, such as the speed imposed downstream by the common circumferential rotational speed of the smooth cylinder 14 and of the ribbed roll 12. This slight excess of speed creates a frictional sliding of the surface of the cylinder 16 with respect to the cardboard 6, which will induce a tension or traction force f along the entire width of the cardboard strip 6.

As is clearly illustrated in the FIGURE, the traction cylinder 16 is arranged parallel to and close to the first upper ribbed cylinder or roll 10 in such a manner as to increase the contact surface between the cardboard just shaped and the lower ribbed cylinder 12, according to an angle of contact e, which is at least greater than 25° and, in this case is practically equal to 45°. In this contact surface forming a portion of the cylinder, the tension of the traction force f is reflected in the form of a resultant pressure force p, which is directed radially inward to hold the covering paper 4 against the corrugated paper 2 during the setting of the glue. This thus creates a more complete and efficacious manner of holding the cover paper 4 against the corrugated paper 2.

In contrast to smooth presses known from the prior art, it is thus no longer useful for the smooth cylinder 14 to be supported excessively against the lower ribbed cylinder 12, with all the disadvantages mentioned hereinabove. According to the present invention, the smooth cylinder is positioned and automatically held close to the ribbed cylinder or roller 12 with an amount of play h just sufficient to effect the first application of the covering paper under a light load on the order of 0 to 7N/mm, and preferably in a range of 3N/mm to 5N/mm. This load is sufficient to burst and release the glue cells with no risk to the paper and the ribbed cylinder.

For this purpose, the rotational axis or axle 17 of the smooth cylinder or roll 14 is held on both ends by levers 55, which are rotatably mobile at one of their ends, preferably on the side at which the covering paper arrives, on a second axle 52 fixedly attached to the frame of the machine. The other end of each lever 50 is supported by a hydraulic jack 60 across a first force detector 62. As shown, the second axle or hinge pin 52 of the levers 50 is at the same height as the first axle 17 of the smooth cylinder 14, so that the action of the jack is essentially a vertical raising and lowering of the smooth cylinder 14, thus permitting the cylinder to come into contact with the lower ribbed roll 12 according to a line of contact coinciding, respectively, with the upper and lower generating lines. In addition, this equality of the height of the rotational axles has the result that a variation in tension in the covering paper, which translates into a force acting on the cylinder, which is also horizontal, does not create any torque at the hinge or pivot formed by the axle 52 and, thus, does not threaten any ill-timed raising or lowering of the smooth roller 14.

At the level of the line of contact between the ribbed roller 12 and the smooth cylinder or roller 14, the upper edge of the lever 50 is constantly supported against an adjustable stop, which includes a linear cam 70 with an oblique surface which rides on an oblique surface of a fixed member 76. A second force detector 63 is arranged in this area. As shown, this cam 70 may be displaced horizontally by a motor 72, which is mounted on the lever 50. The motor 72 has a threaded exit shaft 74, which is threadably received on female threads of the cam 70. Thus, shifting of the cam by rotation of the motor in one of the two directions enables adjusting a separation h between the surfaces of the ribbed roller 12 and the smooth cylinder 14 to a very precise value.

The two force detectors 62 and 63 enable the implementation of an automatic regulation of the separation h, based on a differential measuring according to the following method.

In the first calibration period, the jack 60 lifts the cylinder 14 and the levers 50 against the adjustable stop formed by the cam 70. The first reading of the force detector 62 thus corresponds only to the weight of these elements, which reading is stored for subsequent subtraction, permitting the elimination of the influence of this weight during the rest of the process.

Next, the jack 60 presses the levers 50 against the linear cam 70 with a force Fh oriented upward, the cam 70 being sufficiently advanced that the smooth cylinder 14 does not come into contact with the paper and the lower ribbed cylinder or roll 12. Then, the counter-reaction of the cam 70, as read by the second force detector 63, implies a value Fb, such that at the level of the hinge pin 52 of the levers 50, the quality of the torque $Fh \times Lh = Fb \times Lb$ is obtained. The torque concerned is the clamping torque holding the levers 50 firmly in place.

Subsequently, the linear cam is partially withdrawn so that the adjustable stop is changed so that the smooth surface 14 supports the covering paper 4 to move against the corrugated paper 2 with a linear torque q and, thus, a force of counter-reaction $Fp = q \times La$, wherein La is the width of the paper. Half of this force correspondingly reduces on both sides of the counter-reaction exerted by the stop having the linear cam 70, which translates as a second reading Fb2, which is lower than the first reading Fb1. In other words, in order to apply only a light load q, it is advisable to maintain the reading of the second force detector 63 at a reference setting Fbcons, wherein $Fbcons = 1/Lb\ [Fh \times Lh - (\frac{1}{2} q \times La) \times Lb]$, by advancing or withdrawing the linear cam to the necessary extent by means of the motor 72 and exit shaft 74 to adjust the position of the adjustable stop.

Although various minor modifications may be suggested by those versed in the art, it should be understood that we wish to embody within the scope of the patent granted hereon all such modifications as reasonably and properly come within the scope of our contribution to the art.

We claim:

1. In a smooth press in a single-sided machine for manufacturing corrugated cardboard, said smooth press comprising a frame, a smooth cylinder, means for mounting the smooth cylinder for rotation on an axis to act conjointly with a lower ribbed cylinder in order to apply a covering paper against a corrugated paper passing around the lower ribbed cylinder, and having a traction means arranged downstream from the lower ribbed cylinder and situated with respect to the smooth cylinder so as to present a contact angle of a covering paper against the lower ribbed cylinder, said traction means applying a tension force to the cardboard to create a resultant pressure of the covering paper radially against the corrugating paper at the portion of the contact surface, the improvements comprising the means for mounting the smooth cylinder including a pair of levers arranged subjacent to the lower ribbed cylinder, each lever having first and second ends, the first end of each lever being mounted for rotation on an axle fixed in the frame of the smooth press, the second end of each lever being held by an actuator at a constant pressure across a first force detector and an upper edge of each lever coming to rest against an adjustable stop across a second force detector, said adjustable stop having a motorized cam, said means for mounting regulating a linear support load q on the smooth cylinder against the lower ribbed cylinder to have a value in a range of 0 to 7N/mm.

2. In a smooth press according to claim 1, wherein the traction means is provided with a complementary parallel flexible roller acting on the corrugated paper.

3. In a smooth press according to claim 1, wherein the contact between each lever and the adjustable stop is situated at a level of a line of contact between a smooth cylinder and the ribbed cylinder.

4. In a smooth press according to claim 1, wherein the axle of the levers is situated at the same height as the axis of the smooth cylinder, said covering paper being guided by an upstream roller so as to enter into contact with the surface of the smooth cylinder at a level of a lower generating line and to leave the cylinder at a level of the upper generating line.

5. A method for regulating a smooth press, comprising the steps of providing a smooth press comprising a frame, a smooth roller having a first axle, means for mounting the smooth roller to act conjointly with a lower ribbed cylinder in order to apply a covering paper against a corrugated paper passing around the ribbed cylinder, said means for mounting including a pair of lever arms receiving the axle of the smooth cylinder subjacent to the lower ribbed cylinder, each lever having first and second ends, the first end of each arm being rotationally mounted on a second axle fixed to the frame of the smooth press, while the second end of each arm is held by an actuator at a constant pressure across a first force detector, an upper edge of each lever coming to rest against an adjustable stop having a motorized cam across a second force detector; lifting, by means of the actuators, the levers of the smooth cylinder in order to read a value of a first detector caused only by the weight of the elements and then recalculating these readings to a zero value; bringing each lever to rest against the adjustable stop by means of the actuator with a force Fh detected by the first force detector, relieving the force of the counter-reaction Fb of the corresponding stops detected by the second force detector and establishing, at a level of the second axle of the levers, an equality of the torque $Fh \times Lh = Fb1 \times Lb$, wherein Lb is the distance from the center of the second axle to the adjustable stop and Lh is the distance of the actuator from the center of the second axle; modifying the position of each stop so as to support the smooth cylinder against the ribbed cylinder, creating on both sides a force Fp of counter-reaction of the ribbed cylinder, adjusting the position of the cam of the adjustable stop to obtain a new equality of the torque $Fh \times Lh = (Fb2 \times Lb) + (Fp \times Lp)$, wherein Lp is the distance of the center of the second axle from the line of contact of the smooth cylinder with the ribbed cylinder and Fb2 is a new reading of the second detector, controlling the position of each cam of each adjustable stop to the reading Fbi of the second detector so as to maintain, on both sides, a force Fp at a constant value so that $2 \times Fp$/width of the paper=a desired linear load q.

* * * * *